(12) United States Patent
Fort et al.

(10) Patent No.: US 12,466,571 B2
(45) Date of Patent: Nov. 11, 2025

(54) AIRCRAFT PROVIDED WITH A RAIN-REPELLENT VENTILATION SYSTEM FOR AN ELECTRIC MACHINE

(71) Applicant: AIRBUS HELICOPTERS, Marignane (FR)

(72) Inventors: Patrick Fort, Marseilles (FR); Pascal Alliot, Saint Savournin (FR)

(73) Assignee: AIRBUS HELICOPTERS, Marignane (FR)

( * ) Notice: Subject to any disclaimer, the term of this patent is extended or adjusted under 35 U.S.C. 154(b) by 16 days.

(21) Appl. No.: 18/595,809

(22) Filed: Mar. 5, 2024

(65) Prior Publication Data

US 2024/0409229 A1    Dec. 12, 2024

(30) Foreign Application Priority Data

Jun. 9, 2023    (FR) ...................................... 2305863

(51) Int. Cl.
    *B64D 33/02*    (2006.01)
(52) U.S. Cl.
    CPC .................................... *B64D 33/02* (2013.01)
(58) Field of Classification Search
    CPC ....................................................... B64D 33/02
    See application file for complete search history.

(56) References Cited

U.S. PATENT DOCUMENTS

| | | | |
|---|---|---|---|
| 2,362,552 A * | 11/1944 | Heymann | B64D 33/02 454/76 |
| 2,365,328 A | 12/1944 | Bell | |
| 3,208,214 A | 9/1965 | Servanty et al. | |
| 2009/0253361 A1 | 10/2009 | Porte et al. | |
| 2014/0286764 A1 | 9/2014 | Laurant et al. | |
| 2018/0312269 A1 | 11/2018 | Desvigne | |
| 2019/0084687 A1 | 3/2019 | Scannell et al. | |

(Continued)

FOREIGN PATENT DOCUMENTS

| | | |
|---|---|---|
| CA | 3055979 A1 | 4/2020 |
| EP | 1828571 A1 | 9/2007 |

(Continued)

OTHER PUBLICATIONS

French Search Report for French Application No. FR2305863, Completed by the French Patent Office, Dated Nov. 29, 2023, 8 pages.

*Primary Examiner* — Tye William Abell
(74) *Attorney, Agent, or Firm* — BROOKS KUSHMAN P.C.

(57) ABSTRACT

An aircraft provided with at least one electric machine accommodated in a compartment separated from an outside environment by a cowling, the aircraft comprising a ventilation system for conveying air from the outside environment to the electric machine. The ventilation system comprises a duct connected to the electric machine and extending up to a free section, the free section being situated in the outside environment, the duct passing through a passage in the cowling, the duct extending partially into the compartment and partially into the outside environment, a free space surrounding the duct in the passage and separating the duct from the cowling, the ventilation system comprising a scoop that faces the free section without closing it off according to a vertical axis when the aircraft is on horizontal ground.

20 Claims, 2 Drawing Sheets

(56) References Cited

U.S. PATENT DOCUMENTS

2019/0093541 A1* 3/2019 Pedersen .............. B64D 33/08
2020/0023985 A1   1/2020 Scimone

FOREIGN PATENT DOCUMENTS

| EP | 2776319 A1 | 9/2014 |
| EP | 2226473 A3 | 3/2016 |
| EP | 3403919 A1 | 11/2018 |
| EP | 3418183 A1 | 12/2018 |
| EP | 2880295 B1 | 6/2019 |
| EP | 3560837 A1 | 10/2019 |
| FR | 3021994 A1 | 12/2015 |
| FR | 3026136 A1 | 3/2016 |
| FR | 3065757 B1 | 4/2019 |
| WO | 2006067296 A1 | 6/2006 |
| WO | 2013068671 A1 | 5/2013 |

* cited by examiner

AIRCRAFT PROVIDED WITH A RAIN-REPELLENT VENTILATION SYSTEM FOR AN ELECTRIC MACHINE

CROSS-REFERENCE TO RELATED APPLICATIONS

This application claims priority to French patent application No. FR 23 05863 filed on Jun. 9, 2023, the disclosure of which is incorporated in its entirety by reference herein.

TECHNICAL FIELD

The present disclosure relates to an aircraft provided with a rain-repellent ventilation system for an electric machine.

BACKGROUND

An aircraft conventionally comprises a power plant comprising at least one engine and at least one gearbox. For example, a rotorcraft is provided with at least one engine for rotating at least one rotor via a gearbox. This rotor contributes at least partially to the lift and/or to the propulsion of the rotorcraft.

The engine or engines may be arranged in an engine compartment that is separated from the outside of the aircraft by cowlings. The term "cowling" may refer to a cowl, a movable structure, a fairing, a profiled or partitioned box, etc.

The engine or engines may be heat engines supplied with fuel and air.

Moreover, an aircraft may comprise an electric machine. An electric machine may be in the form of an electrical power generation means capable of converting mechanical energy into electrical energy, an electric motor capable of converting electrical energy into mechanical energy for setting a mechanical system in motion, or a starter-generator connected to a heat engine in order to start the heat engine or produce electrical energy as required. For example, a starter-generator may be kinematically connected to a gas generator of a turboshaft engine.

Such an electric machine is likely to heat up during use. The aircraft may therefore comprise a ventilation system for cooling the electric machine by drawing in cool air from outside this aircraft. Though effective, the aircraft may encounter rainy conditions, and unwanted rainwater may possibly reach the electric machine.

Documents are far removed from this problem, describing engine air intakes.

For example, document US 2020 0 023 985 A1 describes a system having an air intake that accommodates a filter and is covered by a scoop.

Document U.S. Pat. No. 2,362,552 A also describes a scoop arranged over an air intake opening.

Document FR 3 065 757 D1 describes an air intake opening cooperating with a diffuser.

Document US 2019/093541 relates to an aircraft provided with an exhaust collector providing one or more conduits for conveying and discharging the exhaust gases upwards. This exhaust collector comprises a support structure for a cowl positioned at the top and/or sides of the aircraft.

Document U.S. Pat. No. 2,362,552 discloses an air intake scoop intended to separate air from other incoming particles and heavier materials such as water droplets and ice, for example, in order to supply an aircraft cabin or an engine with cool air.

Document CA 3 055 979 describes a ventilation system for a helicopter engine compartment comprising an ejector nozzle, four air intakes, two air plenums and two air slots. The ejector nozzle surrounds the mouth of an exhaust pipe of the engine and uses the flow of exhaust gases to draw air into, through and out of the engine compartment. Two air intakes are fastened to the fuselage of the helicopter in front of the engine compartment to supply air to the two air plenums. Two additional air intakes are fastened in front of the engine compartment to supply air to the upper area of this engine compartment.

Documents EP 3 560 837 A1, US 2019 0 084 687 A1, EP 3 418 183 A1, EP 3 403 919 A1, FR 3 026 136 A1, FR 3 021 994 A1, EP 2 880 295 A4, EP 2 776 319 A1, EP 2 226 473 A3, EP 1 828 571 A1, U.S. Pat. Nos. 3,208,214 A, 2,362,552 A and 2,365,328 A are also known.

SUMMARY

An object of the present disclosure is thus to propose an innovative aircraft that helps overcome the above-mentioned limitations.

The disclosure relates to an aircraft provided with at least one electric machine accommodated in a compartment of this aircraft, said compartment being separated from an outside environment by a cowling, the outside environment being situated outside the aircraft, said aircraft comprising a ventilation system for conveying air from the outside environment to the electric machine.

The ventilation system comprises a duct connected to the electric machine and extending up to a free section, the free section being situated in said outside environment, the duct passing through a passage in the cowling, the duct extending partially into the compartment and partially into the outside environment, a free space surrounding the duct in the passage and separating the duct from the cowling, the ventilation system comprising a scoop that faces the free section without closing it off. This scoop may be situated above the free section without closing it off according to a vertical axis when the aircraft is on horizontal ground.

For example, the electric machine may be an electrical power generation means or an electric motor or a starter-generator. The electric machine may possibly be connected to a heat engine that sets in motion a mechanical power transmission channel possibly comprising at least one rotor. The aircraft may possibly be a rotorcraft.

Therefore, the ventilation system according to the disclosure may tend to limit the flow of water, for example rainwater, towards the electric machine.

If it rains, the water can run over the cowling. However, the duct protrudes into the outside environment, having a segment that extends into this outside environment without touching the cowling. Therefore, any rainwater that reaches the passage by running over the cowling does not enter the duct, but can fall into the free space between the duct and the edge of the cowling that delimits the passage. This water therefore does not enter the electric machine.

Furthermore, the scoop is arranged above the duct. Therefore, the scoop limits the risk of rainwater falling directly into the duct. The scoop can also facilitate the intake of air into the duct while the aircraft is moving forwards.

The aircraft may also comprise one or more of the following features, taken individually or in combination.

According to one possibility, the scoop and said cowling can form a corridor that extends along an extension axis from a first surface that is open to the outside environment up to a second surface that is open to the outside environment.

The scoop is therefore not only open towards the duct but may be traversed from one end to the other by air or a liquid as the aircraft moves forwards. This feature helps prevent rainwater from accumulating in the scoop, where it could fall into the duct.

The extension axis may possibly be parallel to a roll axis of the aircraft.

Therefore, a liquid that enters the corridor via one surface, as the aircraft moves forwards, can exit via the other surface.

According to one possibility compatible with the preceding possibilities, said duct may comprise at least one drainage hole upstream of the electric machine in a direction from the outside environment towards the electric machine.

At least some of the water that might enter the duct or that might form in the duct by condensation is thus discharged by the drainage hole or holes so as not to reach the electric machine.

The duct may possibly comprise an intake segment passing through the cowling and an outlet segment connected to the intake segment and leading to the electric machine, the outlet segment extending along an axis of elongation in the continuation of the electric machine, the intake segment extending along an elevation axis from the outlet segment to the outside environment, said drainage hole being provided in the outlet segment.

The drainage hole or holes are positioned in such a way as to optimize the discharge of water.

According to one possibility compatible with the preceding possibilities, said duct may be connected by at least one fastening to a structure that is stationary in a reference frame of the aircraft.

The cowling can thus be handled separately from the duct.

The duct then possibly has a freedom of movement limited to a range of positions in relation to the structure.

The duct therefore does not hinder the relative movement of the electric machine in relation to the cowling. Indeed, the electric machine is likely to move slightly during use. The fastening means that such movement is tolerated.

For example, the fastening comprises a clamp that surrounds the duct, this clamp being connected to the structure by a link that gives the clamp at least one degree of translational freedom and/or at least one degree of rotational freedom.

According to one possibility compatible with the preceding possibilities, the passage may be oblong in shape.

The passage may have an oblong annular shape along the extension axis and allows the duct to move with the electric machine in relation to the cowling.

According to one possibility compatible with the preceding possibilities, a minimum distance separates said duct from an edge of the cowling delimiting the passage, this minimum distance being between 5 millimeters and 20 millimeters.

The expression "minimum distance" denotes the smallest distance at each instant between the duct and the edge.

This minimum distance is sufficient to produce a space between the edge of the passage and the duct that allows water to be discharged.

According to one possibility compatible with the preceding possibilities, the duct protrudes from the cowling into the outside environment by a minimum height of between 5 millimeters and 20 millimeters.

The expression "minimum height" denotes the smallest distance at each instant between the top of the duct and the passage.

This minimum height is sufficient to limit the risks of water entering.

The height of the top of the duct in relation to the passage may vary in azimuth. Moreover, the minimum height may depend on the dimension of the passage.

According to one possibility compatible with the preceding possibilities, the scoop may be arranged between the passage and a rotor of said aircraft, said rotor being situated in the outside environment.

The passage may thus be arranged on a cowling facing a rotor, for example on a top surface of a body of the aircraft.

According to one possibility compatible with the preceding possibilities, the ventilation system may comprise at least one protective screen.

The term "screen" denotes a perforated member that limits the entry of external matter.

Therefore, a protective screen may be arranged in the free section.

The protective screen may entirely cover the free section.

Additionally, or alternatively, a protective screen may be arranged between the scoop and the cowling.

The protective screen may entirely cover a passage surface delimited by the scoop and the cowling.

BRIEF DESCRIPTION OF THE DRAWINGS

The disclosure and its advantages appear in greater detail in the context of the following description of embodiments given by way of illustration and with reference to the accompanying figures, wherein.

DETAILED DESCRIPTION

Elements that are present in more than one of the figures are given the same references in each of them.

FIGS. 1 to 4 show a reference frame of an aircraft 1 according to the disclosure. This reference frame comprises three axes X, Y and Z orthogonal to each other.

The axis X is referred to as the longitudinal axis. The term "longitudinal" is relative to any direction parallel to this axis X.

The axis Y is referred to as the transverse axis. The term "transverse" is relative to any direction parallel to this axis Y.

Finally, the axis Z is referred to as the elevation axis. The expression "elevation" is relative to any direction parallel to this axis Z.

Figure 1:
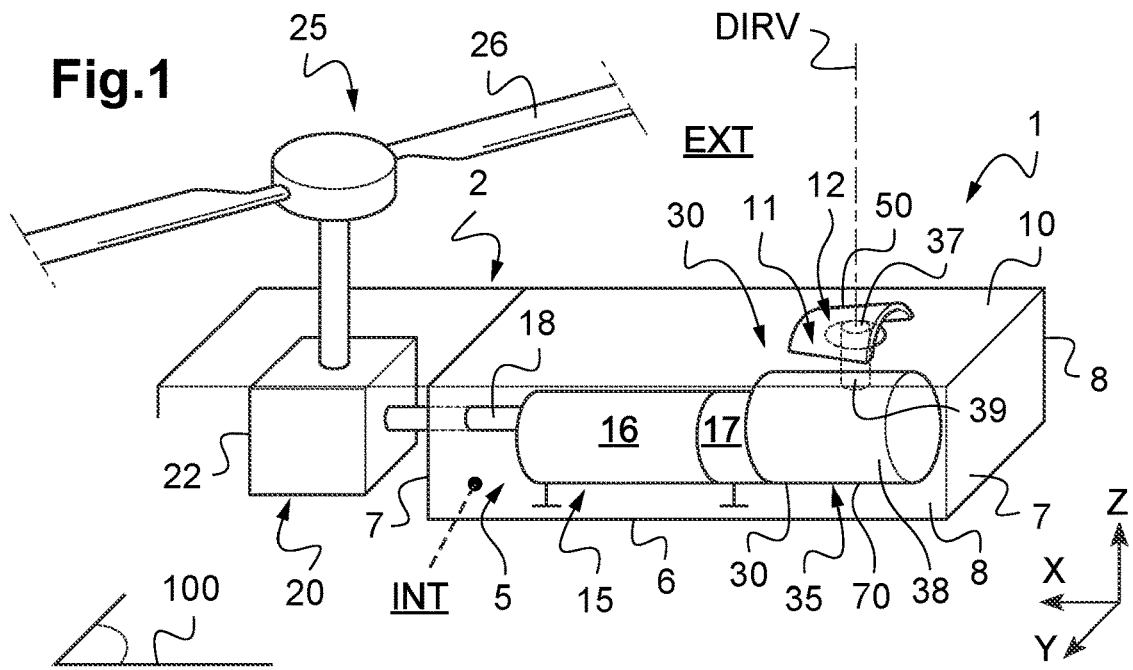
FIG. 1 is a three-dimensional diagram showing part of an aircraft according to the disclosure.

FIG. 1 shows an aircraft 1 according to the disclosure schematically. The aircraft 1 is shown partially so as not to unnecessarily clutter FIG. 1.

The aircraft is provided with an airframe 2 wherein at least one compartment 5 is located, such as an engine compartment, for example. An electric machine 17 is accommodated at least partially in the internal space INT of the compartment 5.

The compartment 5 is closed, in particular by a cowling 10, this cowling 10 separating an internal space INT of the compartment 5 from an outside environment EXT situated outside the aircraft 1.

The compartment 5 may be delimited by at least one wall 6, 7, 8, one of the walls comprising the cowling 10. The wall or walls 6, 7, 8 may be firewalls, for example being fireproof. The compartment 5 may be split into several sub-compartments.

For example, the cowling 10 is located above the electric machine 17 when the aircraft 1 is resting on the ground 100. Therefore, the compartment 5 is delimited longitudinally by two longitudinal walls 7, transversely by two transverse walls 8 and vertically by a floor 6 and a wall comprising the cowling 10.

Moreover, the electric machine 17 may cooperate with a heat engine 15. This heat engine 15 may comprise a power shaft 18, connected to a mechanical power transmission channel 20, possibly by passing through a longitudinal wall 7. This mechanical power transmission channel 20 may set in motion at least one rotor 25. For example, the power shaft 18 is connected to a gearbox 22 that rotates the rotor 25. The rotor 25 comprises a plurality of blades 26, FIG. 1 showing a single complete blade for the sake of convenience. This rotor 25 forms a rotary wing 2, for example.

The heat engine 15 is suitable for burning a fuel in order to set the power shaft 18 in motion. According to one possibility, the heat engine 15 may comprise an engine block 16 of the turboshaft engine or piston engine type, for example.

For example, the electric machine may cooperate with the heat engine. The electric machine may comprise an electrical power generation means, an electric motor or a starter-generator. For example, the electric machine 17 may function, as required, in a starter mode and in an electrical power generator mode. When there is a turboshaft engine, the electric machine may be connected to a gas generator of the turboshaft engine.

Moreover, the aircraft 1 comprises a ventilation system 30 for conveying air from the outside environment EXT to the electric machine 17.

Figure 2:
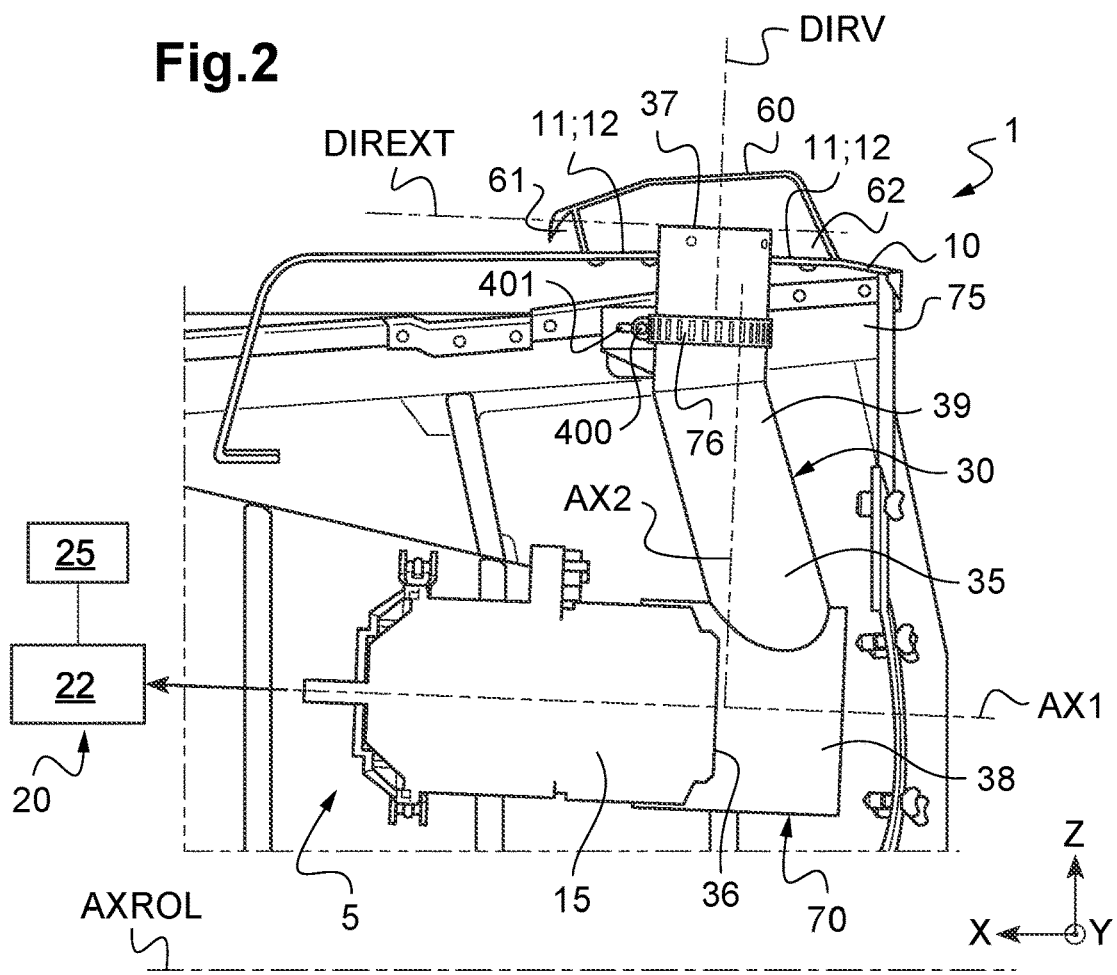
FIG. 2 is a partially transparent view of the aircraft of FIG. 1.

FIG. 2 is a partially transparent cutaway view showing the ventilation system 30. In particular, part of the cowling 10 has been rendered transparent.

The ventilation system 30 comprises a duct 35 leading to the electric machine 17 and the outside environment EXT.

The duct 30 comprises a proximal region 36 leading to the electric machine 17 and extends up to a free section 37 that is open to the outside environment.

The free section 37 is situated in the outside environment EXT. The duct 35 extends partially into the outside environment EXT and partially into the compartment 5, to be connected to the electric machine 17. To this end, the duct 35 passes all the way through the cowling 10. More precisely, the duct 35 passes through a passage 11 formed in the cowling 10. Therefore, the duct 35 has a segment provided with the free section protruding from the cowling 10 into the outside environment EXT.

For example, the duct 35 comprises an outlet segment 38 secured to an intake segment 39. The outlet segment 38 comprises the proximal region 36 supplying cool air to the electric machine 17 and may extend along an axis of elongation AX1 in the continuation of the electric machine 17. For example, the outlet segment is in the shape of a cylinder with a circular base. The intake segment 39 comprises the free section 37 and may extend along an elevation axis AX2, that is different from the axis of elongation AX1, from the outlet segment 38 to the outside environment EXT, passing through the passage 11 in the cowling 10.

Moreover, the duct 35 may be fastened by one or more fastenings 76 to a structure 75 of the aircraft 1, this structure 75 being stationary in the reference frame of the aircraft. According to the example shown, the intake segment 39 is fastened by a fastening such as a clamp 76 to a structure 75 carrying the cowling 10. This clamp 76 clamps a segment of the duct and is then fixed to the structure 75 by a screw/nut system 400 or the like passing through an oblong hole 401 in the structure 75. According to the example, the structure comprises a support provided with the oblong hole 401, this support being able to be secured to a cross-member of the aircraft. The clamp 76 and the duct 35 may thus be able to move in translation in relation to the structure 75, within the limits imposed by the oblong hole 401.

According to one possibility unrelated to these aspects, the duct 35 may comprise at least one drainage hole 70 upstream of the electric machine 17. The term "upstream" is to be considered in a direction from the outside environment EXT towards the electric machine 17.

One or more holes 70 may in particular be provided in the lowest region of the duct 35 when the aircraft is resting on horizontal ground 100. According to the example shown, at least one drainage hole 70 is provided in the outlet segment 38.

Figure 3:
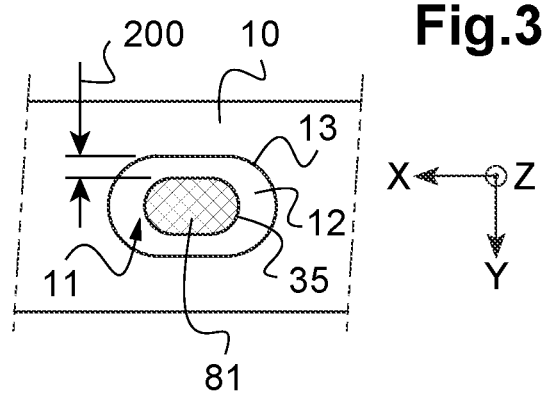
FIG. 3 is a diagram showing a top view of a duct passing through a passage in the cowling.

According to another aspect, and as shown in FIG. 3, the passage 11 is delimited by an edge 13 of the cowling 10. The duct 35 then passes through the passage 11 without coming into contact with the edge 13. A free space 12 therefore surrounds the duct 35 in the passage 11. This free space permanently separates the duct 35 from the cowling 10.

This passage 11 may have an oblong shape. This passage 11 may allow relative movement of the duct 35 and the cowling 10, for example in translation.

Furthermore, a minimum distance 200 separates the duct 35 and the edge 13 of the cowling delimiting the passage 11, this minimum distance 200 possibly being between 5 millimeters and 20 millimeters.

Moreover, a protective screen may be secured to the duct 35. For example, a protective screen 81 is arranged in the free section 37.

Figure 4:
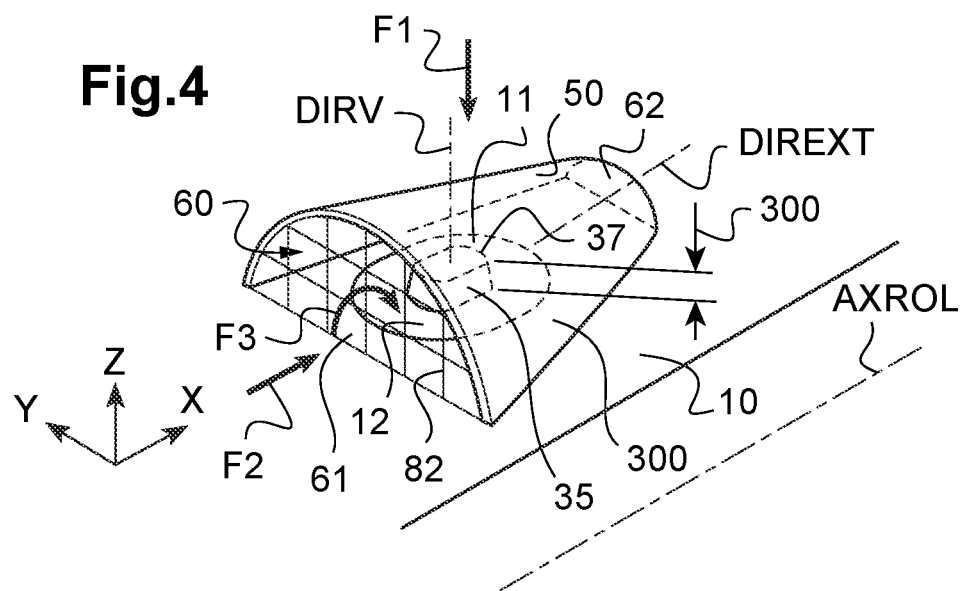
FIG. 4 is a diagram showing the scoop.

Furthermore, and in reference to FIG. 4, the duct 35 may protrude from the cowling into the outside environment EXT by a minimum height 300 of between 5 millimeters and 20 millimeters.

Furthermore, the ventilation system 30 comprises a scoop 50. The scoop 50 faces the free section 37 and does not close off this free section 37. When the aircraft 1 is on horizontal ground 100, the scoop 50 is situated above the free section 37, without closing it off, for example according to a vertical axis DIRV. In the presence of a rotor 25 as shown in FIG. 1, the scoop 50 may be arranged between the passage 11 and the rotor 25.

In reference to FIG. 4, this scoop 50 may comprise a plate arranged over the free section 37. This plate may be fixed to the cowling 10 by conventional means, for example means for screwing, crimping, gluing, welding or the like. This plate is curved according to the example shown.

The scoop 50 and the cowling 10 may form a corridor 60 between the scoop 50 and the cowling 10. This corridor 60 may extend along an extension axis DIREXT from a first surface 61 that is open to the outside environment EXT up to a second surface 62 that is open to the outside environment EXT. This extension axis DIREXT may be parallel to a roll axis AXROL of the aircraft 1.

Moreover, the scoop 50 may be tapered from the first surface 61 to the second surface 62. The first surface 61 may have a first area greater than a second area of the second surface 62 so as to tend to direct air towards the duct 35. For example, the scoop 50 has a substantially frustoconical shape.

Furthermore, a protective screen 82 may be arranged between the scoop 50 and the cowling 10, for example in the first surface 61.

FIG. 4 shows how the disclosure functions. Rain falling on the aircraft in the direction shown by the arrow F1 impacts the scoop 50 and does not enter the duct 35.

The scoop 50 does not close off the duct 35, and does not prevent air from entering the duct 35.

Moreover, if water flows along the cowling 10 in the direction shown by the arrow F2, this water enters the corridor 60 through the first surface 61 and tends to drop into the free space 12 without entering the duct 35, that has a free section 37 that protrudes above the passage 11 without touching the cowling. If the water bypasses the passage 11, this water exits the scoop 50 through the second surface 62, and is therefore unlikely to accumulate in the scoop to the point that it overflows into the duct 35. Finally, if the water flows into the duct 35, the drainage hole or holes 70 can drain it out of the duct 35.

Naturally, the present disclosure is subject to numerous variations as regards its implementation. Although several embodiments are described above, it should readily be understood that it is not conceivable to identify exhaustively all the possible embodiments. It is naturally possible to replace any of the means described with equivalent means without going beyond the ambit of the present disclosure and the claims.

What is claimed is:

1. An aircraft provided with at least one electric machine housed in a compartment of the aircraft, the compartment being separated from an outside environment by a cowling, the outside environment being situated outside the aircraft, the aircraft comprising:
   a ventilation system for conveying air from the outside environment to the electric machine, wherein the ventilation system comprises a duct connected to the electric machine and extending up to an open section open to the outside environment, the open section being situated in the outside environment, the duct passing through a passage in the cowling, the duct extending partially into the compartment and partially into the outside environment, an open space surrounding the duct in the passage and separating the duct from the cowling, the ventilation system comprising a scoop that faces the open section without closing the open section off.

2. The aircraft according to claim 1,
   wherein the passage is oblong in shape.

3. The aircraft according to claim 1,
   wherein a minimum distance separates the duct and an edge of the cowling delimiting the passage, this minimum distance being between 5 millimeters and 20 millimeters.

4. The aircraft according to claim 1,
   wherein the duct protrudes from the cowling into the outside environment by a minimum height of between 5 millimeters and 20 millimeters.

5. The aircraft according to claim 1,
   wherein the scoop is arranged between the passage and a rotor of the aircraft, the rotor being situated in the outside environment.

6. The aircraft according to claim 1,
   wherein the scoop and the cowling form a corridor extending along an extension axis from a first surface that is open to the outside environment up to a second surface that is open to the outside environment.

7. The aircraft according to claim 6,
   wherein the extension axis is parallel to a roll axis of the aircraft.

8. The aircraft according to claim 1,
   wherein the duct comprises at least one drainage hole upstream of the electric machine in a direction from the outside environment towards the electric machine.

9. The aircraft according to claim 8,
   wherein the duct comprises an intake segment passing through the cowling and an outlet segment connected to the intake segment leading to the electric machine, the outlet segment extending along an axis of elongation of the electric machine, the intake segment extending along an elevation axis from the outlet segment to the outside environment, the drainage hole being formed in the outlet segment.

10. The aircraft according to claim 1,
    wherein the duct is connected by at least one fastener to an aircraft structure that is stationary in a reference frame of the aircraft.

11. The aircraft according to claim 10,
    wherein the duct has a freedom of movement limited to a range of positions in relation to the aircraft structure.

12. The aircraft according to claim 1,
    wherein the ventilation system comprises at least one protective screen.

13. The aircraft according to claim 12,
    wherein the protective screen is arranged in the section open to the outside environment.

14. The aircraft according to claim 12,
    wherein the protective screen is arranged between the scoop and the cowling.

15. An aircraft having an electric machine in a compartment of the aircraft, the compartment separated from an outside environment by a cowling, the outside environment being situated outside the aircraft, the aircraft comprising:
    a ventilation system for conveying air from the outside environment to the electric machine, the ventilation system comprising a duct connected to the electric machine and extending to an open section open to the outside environment, the open section disposed in the outside environment, the duct passing through a passage in the cowling, the duct having an internal portion extending into the compartment and an external portion extending into the outside environment, an open space surrounding the duct in the passage and separating the duct from the cowling, the ventilation system comprising a scoop spaced from and facing the open section.

16. The aircraft according to claim 15,
    wherein the scoop and the cowling form a corridor extending along an extension axis from a first surface that is open to the outside environment up to a second surface that is open to the outside environment, wherein the extension axis is parallel to a roll axis of the aircraft.

17. The aircraft according to claim 15,
    wherein the duct comprises a drainage hole upstream of the electric machine in a direction from the outside environment towards the electric machine, wherein the duct comprises an intake segment passing through the cowling and an outlet segment connected to the intake segment leading to the electric machine, the outlet segment extending along an axis of elongation of the electric machine, the intake segment extending along an elevation axis from the outlet segment to the outside environment, the drainage hole being formed in the outlet segment.

18. The aircraft according to claim 16, wherein a minimum distance separates the duct and an edge of the cowling delimiting the passage, the minimum distance being between 5 millimeters and 20 millimeters, and wherein the scoop is arranged between the passage and a rotor of the aircraft, the rotor being situated in the outside environment.

19. The aircraft according to claim 16, wherein the duct protrudes from the cowling into the outside environment by a minimum height of between 5 millimeters and 20 millimeters.

20. An aircraft comprising:

a compartment;

an electric machine in the compartment of the aircraft;

a cowling separating the compartment from an outside environment situated outside the aircraft;

a ventilation system for conveying air from the outside environment to the electric machine, the ventilation system comprising a duct extending between and connecting the electric machine to an open section that is open to, and disposed in, the outside environment, the cowling having a passage that the duct passes through, the duct having an internal portion extending into the compartment and an external portion extending into the outside environment, an open space surrounds the duct in the passage and separates the duct from the cowling, the ventilation system comprising a scoop spaced from and facing the open section.

* * * * *